Jan. 3, 1961 H. KOSMALSKI 2,966,918
FLUID PRESSURE OPERATED ROTATION RESPONSIVE CONTROL DEVICE
Filed Jan. 30, 1957
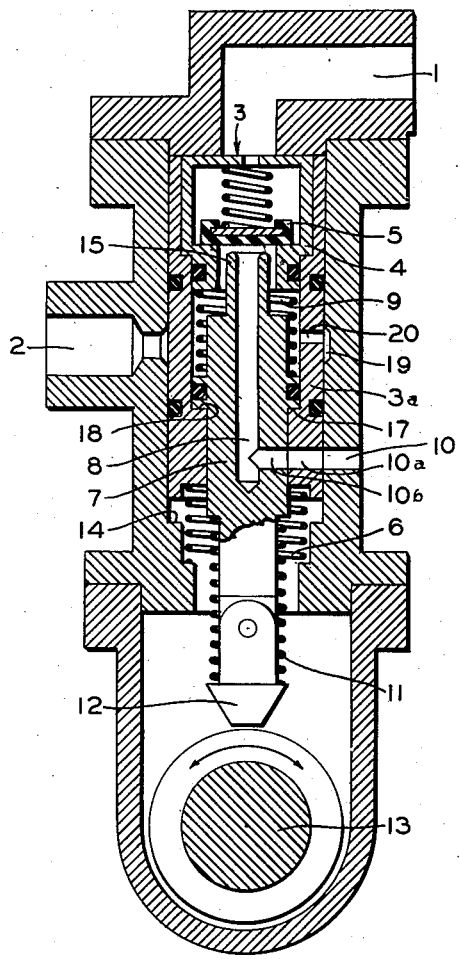
INVENTOR.
Hermann Kosmalski
BY
Adelbert O. Steinmiller
ATTORNEY

United States Patent Office 2,966,918
Patented Jan. 3, 1961

2,966,918

FLUID PRESSURE OPERATED ROTATION RESPONSIVE CONTROL DEVICE

Hermann Kosmalski, Hannover, Germany, assignor to Westinghouse-Bremsen-Gesellschaft m.b.H., Hannover, Germany Filed Jan. 30, 1957, Ser. No. 637,250

Claims priority, application Germany July 16, 1956

5 Claims. (Cl. 137—102)

This invention relates to fluid pressure operated rotation responsive control devices for fluid pressure operated control systems, which control devices, depending upon the stationary position or rotation of a shaft, produce two respective and different fluid pressures in a control pipe whereby such pressure difference is utilized for controlling operation of a fluid pressure responsive device such as a valve device, for example, which, in turn, may be utilized for effecting operation of claw couplings or a clutch carried by a rotatable shaft during such time that the shaft is in a non-rotating state rather than in a rotating state, to prevent damage to the drive coupling.

A control device of the type above described is disclosed, for example, in United States Patent No. 2,885,171, issued to Nowack et al. on May 5, 1959. The device, as disclosed in the immediately above-mentioned patent comprises a control piston with a feeler member associated therewith. The feeler member is adapted to be operated in response to fluid pressure acting on the piston, into frictional engagement with some portion of the rotatable shaft associated with the claw couplings. Movement of the feeler member and consequently the piston, is limited to a certain amount or to a first position when the shaft is in a non-rotating condition, and, due to the type of pivotal connection between said feeler member and the piston, said feeler member may be rocked about a pivot point at said pivotal connection to one side of the shaft to permit greater movement, or movement to a second position, of said piston when the shaft is rotating. When in its first position (in which the shaft is in a non-rotating condition), the piston operates to cut off the control pipe from atmosphere to allow build-up of fluid pressure in said control pipe, in response to which pressure the valve device connected thereto operates to effect operation of the claw couplings, and when in its second position (in which the shaft is in a rotating condition), the piston effects intermittent connection and venting of said control pipe to atmosphere to prevent build-up of pressure in the control pipe and consequently prevents operation of the valve device for effecting any operation of the claw couplings. The intermittent venting of the control pipe is accomplished by the cooperative action of a pilot piston with the control piston, both pistons operating in cycling fashion, in response to fluid pressure from a source when the shaft is rotating, to produce the venting pulsations on the control pipe, which normally is connected to said source of fluid under pressure, to thereby prevent build-up of pressure in said control pipe to a value effective for operating the valve device connected thereto.

A disadvantage of the type of rotation responsive control device above described lies in the uncertainty attending adequate build-up of fluid pressure in the control pipe, which build-up is influenced by such factors as length and cross section of the piping, piston friction, and variance of fluid pressures at the source, some or all of which, at times, may be unfavorable to proper functioning of the valve device to effect the desired results.

From experience it has also been found that the rotation responsive control device of the type above described, after long periods of trouble-free operation, may suddenly fail by developing an undesirable fluttering action of the pistons with damaging results to both the feeler member and the shaft. Since there is no positive connection between the pilot piston and the control piston, other than fluid pressure communications which are opened and closed by operation of the pilot piston to effect operation of the control piston, the cyclical action may degenerate into an undesirable fluttering action. Applicant's device overcomes this problem by providing a control piston comprising a composite piston and sleeve valve, which control piston provides a unit member for performing the functions of the pilot and control pistons of the device above described, thereby eliminating any possibility of a fluttering action.

Another disadvantage of the type of control device above described is the high fluid pressure consumption resulting from the venting pulsations of the control pipe pressure.

The principal object of the invention is to eliminate the above-mentioned disadvantages by providing a rotation responsive control device which operates to control fluid pressure in a control pipe in such a manner that, as long as the shaft is rotating, the control device effects disconnection of said control pipe from the source of fluid pressure and opens said control pipe to atmosphere, whereby no operative effect is produced on the device connected thereto to be controlled, nor is fluid pressure unnecessarily consumed. When the shaft is in a non-rotating state, however, the control device operates to disestablish the connection of said control pipe to atmosphere and establish the connection to the source of fluid pressure to charge the control pipe and thereby cause operation of the device connected thereto. Since applicant's device effects a complete cut-off of the control pipe in the rotating state of the shaft, the length and cross-sectional dimension of the pipe are no longer a factor.

Other advantages and objects of the invention will become obvious from the following more detailed description thereof when read in conjunction with the accompanying single figure drawing which is an elevational diagrammatic view, mostly in section, of a fluid pressure operated rotation responsive control device embodying the invention.

Though not intended to be so limited, a preferred construction of the invention comprises a casing having a fluid pressure inlet or supply connection port 1 and a fluid pressure outlet or delivery connection port 2, the latter being connected to a control pipe (not shown) to which a device desired to be controlled, such as a fluid pressure responsive valve device (not shown), for example, is connected. The inlet 1 opens to one side of a control piston 3 comprising a sleeve valve 3a having an axial bore in which a valve seat member 4 is coaxially carried in fixed relation to said sleeve valve, said valve seat member cooperating, in a manner to be hereinafter described, with a spring weighted double-seat valve 5 disposed in a hollow recess formed in said valve seat member. A spring 6 is provided for biasing the control piston 3, including the sleeve valve 3a and the valve seat member 4, toward an upper position, as shown in the drawing, in which the control pipe is vented to atmosphere in a manner to be hereinafter described.

A valve stem 7 is coaxially disposed within the bore of the sleeve valve 3a in the control piston 3 and is axially movable relative to said sleeve valve of said control piston, against the opposing force of a biasing spring 9 acting between said control piston and said valve stem by having one end bearing against the valve seat member 4 and the other end against the valve stem, said valve stem having axially formed therein a passageway 8 open to the upper end of the valve stem, as viewed in the drawing, and cooperating with said upper end of said valve stem to form an annular seat rib 15 normally occupying an unseated position relative to the double-seat valve 5 in which unseated position the outlet 2 is open to said passageway. The lower end of passageway 8, as viewed in the drawing, is normally connected to an atmospheric venting passageway comprising aligned ports 10b, 10a and 10 formed in the valve stem 7, the sleeve valve 3a and the casing of the rotation responsive device, respectively, in which manner the outlet 2 (and, therefore, the control pipe connected thereto) may be vented to atmosphere when said piston 3 and valve stem 7 occupy their normal position, it being noted that sufficient relative movement between the valve stem 7 and the sleeve valve 3a or between the sleeve valve 3a and the casing will lap off said passageway to close passageway 8 to atmosphere.

At its lower end, as viewed in the drawing, the valve stem 7 has a feeler member 12 coaxially extending therefrom normally held in such extended coaxial relation to said valve stem by a compressed spring 11, but being so pivotally connected to said valve stem as to permit, as will later be explained, angular displacement of said feeler member relative to the axis of the valve stem. The feeler member 12 is of such length as to occupy a position just short of engagement with a portion of a rotatable shaft 13 (rotatable in either direction as indicated by the arrow) when the valve stem 7 is in its normal position, said feeler member, however, being engageable with the shaft 13 upon downward movement, as viewed in the drawing, of the valve stem 7, as will be presently described.

In operation, with no fluid pressure being supplied by way of inlet 1, all members of the control device will occupy their normal respective positions as shown in the drawing. In this position, the outlet connection 2, which opens to an annular channel 19 formed in the inner wall of the casing, is vented to atmosphere by way of a communication comprising a port 20 in the side wall of the sleeve valve 3a and constantly in registry with said channel for all positions of said piston, said port leading to the inner hollow of said sleeve valve to which the passageway 8 opens and by which passageway the communication continues to atmosphere through aligned ports 10, 10a and 10b formed in the casing, sleeve valve 3a and valve stem 7, respectively. Upon introduction of fluid pressure, through inlet 1 to the control piston 3, sufficient to overcome the opposing force of spring 6, said control piston, with the seat member 4, will move downwardly, out of their normal position, and carry with them the valve stem 7 through action of spring 9. It will be noted, at this point, that fluid pressure acting above double-seat valve 5 will seat said valve against the seat member 4. Downward movement, as just described, of piston 3 and valve stem 7, will first effect engagement of the feeler member 12 with the shaft 13 and then of sleeve valve 3a of the piston 3 with an annular shoulder 14 formed internally of the casing, in which position of said piston the vent port 10 is lapped off by sleeve valve of the piston.

If the shaft is rotating, upon engagement of the feeler member 12 with the shaft 13, the rotating action of said shaft will cause the feeler member to be rocked about its pivot point relative to stem 7 to one side or the other of said shaft, depending upon the direction of rotation of the shaft, to thereby permit further downward movement of the valve stem 7 to a lowest possible position or what may be called a non-operative position defined by engagement of a shoulder 17 formed on said valve stem with a shoulder 18 formed on the sleeve valve 3a of the piston 3. With the valve stem 7 in its non-operative position, the seat rib 15 will be maintained in its unseated position relative to the double-seat valve 5, which, in turn, will remain seated on the seat member 4 to prevent supply of fluid pressure from inlet 1 to reach outlet 2 past said valve. In the manner just described, since fluid pressure is prevented from reaching outlet 2, no operative effect is thereby produced on the fluid pressure responsive valve device (not shown) connected to the outlet 2 through the control pipe (not shown) when the shaft 13 is rotating and fluid pressure is supplied through inlet 1.

On the contrary, if the shaft 13 is stationary when feeler member 12 makes contact therewith in response to fluid pressure acting on piston 3 as above described, no displacement of said feeler member to one side or the other of said shaft occurs, and downward movement thereof, and therefore of valve stem 7, will be limited to an intermediate position defined by engagement of said feeler member with the shaft. With fluid pressure acting on piston 3, and since said piston may move relatively to the valve stem 7, the piston 3 will continue its downward movement against opposing forces of springs 6 and 9 until the sleeve valve 3a engages shoulder 14. The valve stem 7 and piston 3 are so arranged that upon relative movement therebetween, as immediately above described, the seat rib 15 will engage and seal against the double-seat valve 5 to cut off passageway 8 from outlet 2 and concurrently unseat said double-seat valve from seat member 4 to permit fluid pressure supply to reach outlet 2 and thereby the fluid pressure responsive valve device (not shown) connected thereto to produce operation thereof for effecting the desired result.

To render the control device inoperative it is merely necessary to cut off supply of fluid pressure to inlet 1, in which case the piston 3 and the valve stem 7 will be returned to their normal positions by the springs 6 and 9.

Having now described the invention, what I claim as new and desire to secure by Letters Patent, is:

1. A fluid pressure operated control device for sensing whether a shaft is stopped or rotating, said device comprising a casing having a chamber through which a cooperating shaft extends, a bore, one end of which opens into said chamber at substantially a right angle to the axis of rotation of the shaft and the opposite end of which is connected to a fluid pressure inlet port, a fluid pressure outlet opening out of said bore intermediate the ends thereof, and a venting port opening out of said bore intermediate the ends thereof for connecting said bore to atmosphere, a cylindrical sleeve valve member operable in said bore and having an internal bore constantly connected to said outlet, a cylindrical stem slidably operable in the bore of said sleeve valve member and extending into the said chamber of said casing, a feeler member pivotally carried on the end of said stem in said chamber and biased to a position in coaxial relation to the stem, said sleeve valve member and said stem having cooperating ports and being biased to such relative position that said ports establish a connection between the bore of said sleeve valve member and said venting port, piston means subject to pressure of fluid supplied through said inlet for moving said sleeve valve member and stem a limited amount in the casing bore toward the shaft, to close said venting port off from the bore in the casing, a check valve carried by the piston and engaged by the end of said stem and unseated, thereby to establish communication between said inlet and said outlet, only when said feeler member engages the shaft while said shaft is not rotating, said check valve remaining seated on said piston by the fluid pressure supplied through the said inlet to move said stem with said sleeve valve member, when said feeler member is moved laterally due to engagement with said shaft while the shaft is rotating, thereby to prevent supply of fluid pressure past said check valve from said inlet to said outlet.

2. A fluid pressure operable control device for use with a rotatable member and comprising, in combination, a casing having a fluid pressure inlet, a fluid pressure outlet and an atmospheric vent port, piston valve means operable within said casing, a valve stem member telescopically operable within a coaxial bore in said piston valve means, yieldable means interposed between said piston valve means and said valve stem member for imparting operative movement to said valve stem member from said piston valve means and permitting axial relative movement therebetween, said piston valve means having a selected position, in which said valve stem member occupies a first position relative thereto and in which a supply communication between said inlet and outlet is disestablished and a venting communication between said outlet and said vent port is established, and being operable, responsively to pressure of fluid supplied via said inlet, to a different position for effecting movement, through said yieldable means, of said valve stem member to an intermediate position, in which said valve stem member occupies a second position relative to said piston valve means and in which said supply communication is established and said venting communication is disestablished, and for effecting movement of said valve stem member to a non-operative position, in which said valve stem member resumes its said first position relative to said piston valve means and in which said supply and venting communications are both disestablished, a rotation sensing member carried by said valve stem member and engageable with the rotatable member upon movement of said valve stem member by movement of said piston valve means toward its different position, said rotation sensing member being effective, when engaging the rotatable member in a non-rotative state, for limiting operative movement of said valve stem member a certain amount to determine its said intermediate position and being pivotable, relative to the direction of movement of said valve stem member, by rotation of the rotatable member when in engagement therewith in a rotating state, to permit an additional amount of movement of said valve stem member to determine its said non-operative position, and spring means for restoring said piston valve means to its said selected position and said valve stem member to its said first position relative to said piston valve means upon termination of supply of pressurized fluid via said inlet.

3. The combination defined in claim 2 in which the piston valve means comprises a valve seat member and a valve adapted for seating thereon, when said valve stem member is in its first position relative to said piston valve means, for effecting disestablishment of said supply communication, said valve being operable to an unseated position from said valve seat member by said valve stem member, when in its said second position relative to said piston valve means, for effecting establishment of said supply communication.

4. A fluid pressure operable control device for use with a rotatable member and comprising, in combination, a casing having a fluid pressure supply inlet, a fluid pressure delivery outlet and an atmospheric vent port, said supply inlet being connectable to a source of fluid under pressure and said delivery outlet being connectable to a fluid pressure operable device to be controlled, a piston having a coaxial bore therein and being operable within a coaxial bore of said casing, said piston having one side open to said supply inlet and subjectable to fluid under pressure supplied therethrough to move from a selected position, defined by engagement of the piston with a first projection in said casing, to a different position defined by engagement of the piston with a second projection formed in said casing, means communicating said supply inlet and said delivery outlet to the coaxial bore in said piston, a valve seat member fixed on said piston, a valve carried by said piston and baised to a seated position on said valve seat member in which a supply communication between said supply inlet and said delivery outlet is disestablished, said valve being operable to an unseated position in which said supply communication is established, a valve-operating member axially movable within said coaxial bore in said piston, said valve-operating member having formed therein a coaxial passageway open to said vent port in the selected position of said piston and cut off from said vent port in the said different position of said piston, said valve-operating member having formed thereon at one end an annular valve seat into which said coaxial passageway opens, said annular valve seat being engageable with said valve but baised to an unseated position relative thereto in which a venting communication between said delivery outlet and said vent port is established, said valve-operating member occupying a certain position relative to said piston, when the latter is in its selected position, in which certain position said annular valve seat is in its unseated position, and being operable by movement of said piston from its selected position toward its different position, to an intermediate position, in which, in consequence of the relative axial movement with respect to said piston, said valve-operating member causes said annular valve seat to occupy a seated position on said valve to disestablish said venting communication and move said valve to its unseated position from said valve seat member to establish said supply communication, and a feeler member pivotally carried by said valve-operating member and engageable with the rotatable member, upon movement of said piston toward its different position, for limiting movement of said valve-operating member to its said intermediate position and thereby causing movement of said piston, relative to said valve-operating member, to its said different position when the rotatable member is in a non-rotative state, said feeler member being pivoted relative to the valve-operating member upon engagement with the rotatable member in a rotating state, to permit additional movement of said valve-operating member beyond its intermediate position to a non-operative position, in which said valve operating member resumes said certain position relative to said piston to disestablish said supply communication.

5. A fluid pressure operated control device for sensing whether a rotary shaft is stopped or rotating, said device comprising a casing having a fluid pressure inlet, a fluid pressure outlet and a venting port, valve means within the casing effective in a selected position when fluid pressure is not supplied to said inlet to prevent flow of fluid under pressure from said inlet to said outlet and at the same time establish communication between said outlet and said venting port, and operative upon the supply of fluid under pressure to said inlet to either a first or a second position, depending upon whether an associated shaft is in a non-rotating or rotating state, respectively, said valve means being effective in its said first position to establish a supply communication for supplying fluid under pressure from said inlet to said outlet and at the same time to disestablish said communication between said outlet and said venting port, and effective in its said second position to disestablish said supply communication and said communication between said outlet and said venting port, a feeler member pivotally carried by said valve means and engageable with the shaft upon operative movement of said valve means in response to said supply of fluid under pressure to said inlet, said feeler member being effective, when the shaft is in said non-rotative state, for limiting operative movement of said valve means a certain amount to determine its said first position, and being pivoted, relative to the direction of movement of said valve means, by rotation of the shaft when rotating, to permit an additional amount of movement of said valve means to determine its said second position, and spring means for restoring said valve means to its said selected position upon termination of supply of fluid under pressure to said inlet.

References Cited in the file of this patent

UNITED STATES PATENTS

| | | |
|---|---|---|
| 1,098,760 | Reed | June 2, 1914 |
| 2,885,171 | Nowack | May 5, 1959 |

FOREIGN PATENTS

| | | |
|---|---|---|
| 623,231 | France | Mar. 14, 1927 |
| 397,439 | Great Britain | Aug. 24, 1933 |
| 536,796 | Great Britain | May 27, 1941 |
| 1,073,882 | France | of 1954 |